United States Patent

Hanrahan

(10) Patent No.: US 9,620,792 B2
(45) Date of Patent: Apr. 11, 2017

(54) THERMAL ENERGY RECYCLING FUEL CELL ARRANGEMENT

(75) Inventor: Paul R. Hanrahan, Farmington, CT (US)

(73) Assignee: AUDI AG, Ingolstadt (DE)

(*) Notice: Subject to any disclaimer, the term of this patent is extended or adjusted under 35 U.S.C. 154(b) by 890 days.

(21) Appl. No.: 13/996,081

(22) PCT Filed: Jan. 3, 2011

(86) PCT No.: PCT/US2011/020008
§ 371 (c)(1),
(2), (4) Date: Jun. 20, 2013

(87) PCT Pub. No.: WO2012/093991
PCT Pub. Date: Jul. 12, 2012

(65) Prior Publication Data
US 2013/0266882 A1  Oct. 10, 2013

(51) Int. Cl.
| H01M 8/04 | (2016.01) |
| H01M 8/04007 | (2016.01) |
| H01M 8/04014 | (2016.01) |
| H01M 8/04089 | (2016.01) |
| H01M 8/2425 | (2016.01) |
| H01M 8/1231 | (2016.01) |

(52) U.S. Cl.
CPC ... *H01M 8/04007* (2013.01); *H01M 8/04014* (2013.01); *H01M 8/04097* (2013.01); *H01M 8/1231* (2016.02); *H01M 8/2425* (2013.01); *H01M 8/04067* (2013.01); *Y02E 60/50* (2013.01)

(58) Field of Classification Search
None
See application file for complete search history.

(56) References Cited

U.S. PATENT DOCUMENTS

| 3,976,507 A | 8/1976 | Bloomfield |
| 4,001,041 A | 1/1977 | Menard |
| 4,041,210 A | 8/1977 | Van Dine |
| 4,128,700 A | 12/1978 | Sederquist |
| 4,622,275 A | 11/1986 | Noguchi et al. |
| 5,071,719 A * | 12/1991 | Rostrup-Nielsen H01M 8/04097 429/415 |
| 5,413,879 A | 5/1995 | Domeracki et al. |

(Continued)

OTHER PUBLICATIONS

International Preliminary Report on Patentability for International Application No. PCT/US2011/020008 dated Jul. 18, 2013.

(Continued)

*Primary Examiner* — Barbara Gilliam
*Assistant Examiner* — Adam A Arciero
(74) *Attorney, Agent, or Firm* — Seed Intellectual Property Law Group LLP

(57) ABSTRACT

An example fuel cell arrangement includes a fuel cell stack configured to receive a supply fluid and to provide an exhaust fluid that has more thermal energy than the supply fluid. The arrangement also includes an ejector and a heat exchanger. The ejector is configured to direct at least some of the exhaust fluid into the supply fluid. The heat exchanger is configured to increase thermal energy in the supply fluid using at least some of the exhaust fluid that was not directed into the supply fluid.

10 Claims, 2 Drawing Sheets

(56) References Cited

U.S. PATENT DOCUMENTS

| | | | |
|---|---|---|---|
| 5,573,867 A | 11/1996 | Zafred et al. | |
| 7,118,818 B2 | 10/2006 | Agnew et al. | |
| 7,223,487 B2 | 5/2007 | Morita | |
| 7,320,836 B2 | 1/2008 | Draper et al. | |
| 2003/0098145 A1* | 5/2003 | Tada | F28F 19/04 165/166 |
| 2003/0157383 A1* | 8/2003 | Takahashi | H01M 8/04089 429/411 |
| 2007/0072017 A1 | 3/2007 | Hansen et al. | |
| 2007/0275282 A1 | 11/2007 | Veyo et al. | |
| 2008/0090113 A1 | 4/2008 | Keefer et al. | |
| 2009/0035610 A1 | 2/2009 | Kivisaari et al. | |

OTHER PUBLICATIONS

International Search Report and Written Opinion for International Application No. PCT/US2011/020008 dated Oct. 4, 2011.

* cited by examiner

THERMAL ENERGY RECYCLING FUEL CELL ARRANGEMENT

This invention was made with government support under Contract No. DE-NT0003894 awarded by the United States Department of Energy. The Government has certain rights in this invention.

CROSS-REFERENCE TO RELATED APPLICATIONS

This application is the U.S. National Phase of PCT/US2011/020008 filed Jan. 3, 2011.

BACKGROUND

This disclosure relates generally to a fuel cell arrangement and, more particularly, to recycling thermal energy generated by a fuel cell stack of the fuel cell arrangement.

Fuel cell stacks are well known. One type of fuel cell stack includes a plurality of individual solid oxide fuel cells. Each of the solid oxide fuel cells includes a tri-layer cell having an electrolyte layer positioned between a cathode electrode and an anode electrode.

Fuel cell stacks can generate significant thermal energy. Retaining significant thermal energy in the fuel cell stack is undesirable as is known. Some fuel cell stacks rely on a fluid, such as air, to remove thermal energy from the stack. The fluid moves through the fuel cell stack and carries thermal energy away from the stack.

Although the fluid is intended to cool the fuel cell stack, circulating fluid that is too cool can negatively affect the efficiency of the fuel cell stack. Accordingly, fluid that is intended to cool the fuel cell stack is typically preheated before the fluid is introduced to the fuel cell stack. A heat exchanger is often used to preheat the fluid. Heat exchangers include expensive materials and are costly to manufacture.

SUMMARY

An example fuel cell arrangement includes a fuel cell stack configured to receive a supply fluid and to provide an exhaust fluid that has more thermal energy than the supply fluid. The arrangement also includes an ejector and a heat exchanger. The ejector is configured to direct at least some of the exhaust fluid into the supply fluid. The heat exchanger is configured to increase thermal energy in the supply fluid using at least some of the exhaust fluid that was not directed into the supply fluid.

An example fuel cell arrangement includes a fuel cell stack having a multiple of solid oxide fuel cells. The fuel cell stack is configured to receive a supply fluid and to exhaust an exhaust fluid. Some of the exhaust fluid is used to heat the supply fluid within a heat exchanger. The remaining exhaust fluid is included in the supply fluid entering the fuel cell stack.

An example thermal energy recycling method includes moving a supply fluid at a first temperature into a fuel cell stack and moving an exhaust fluid at a second temperature away from the fuel cell stack. The second temperature is greater than the first temperature. The method transfers thermal energy from some of the exhaust fluid to the supply fluid within a heat exchanger. The method adds some of the exhaust fluid to the supply fluid after moving the supply fluid through the heat exchanger.

These and other features of the disclosed examples can be best understood from the following specification and drawings, the following of which is a brief description.

DETAILED DESCRIPTION

Figure 1:
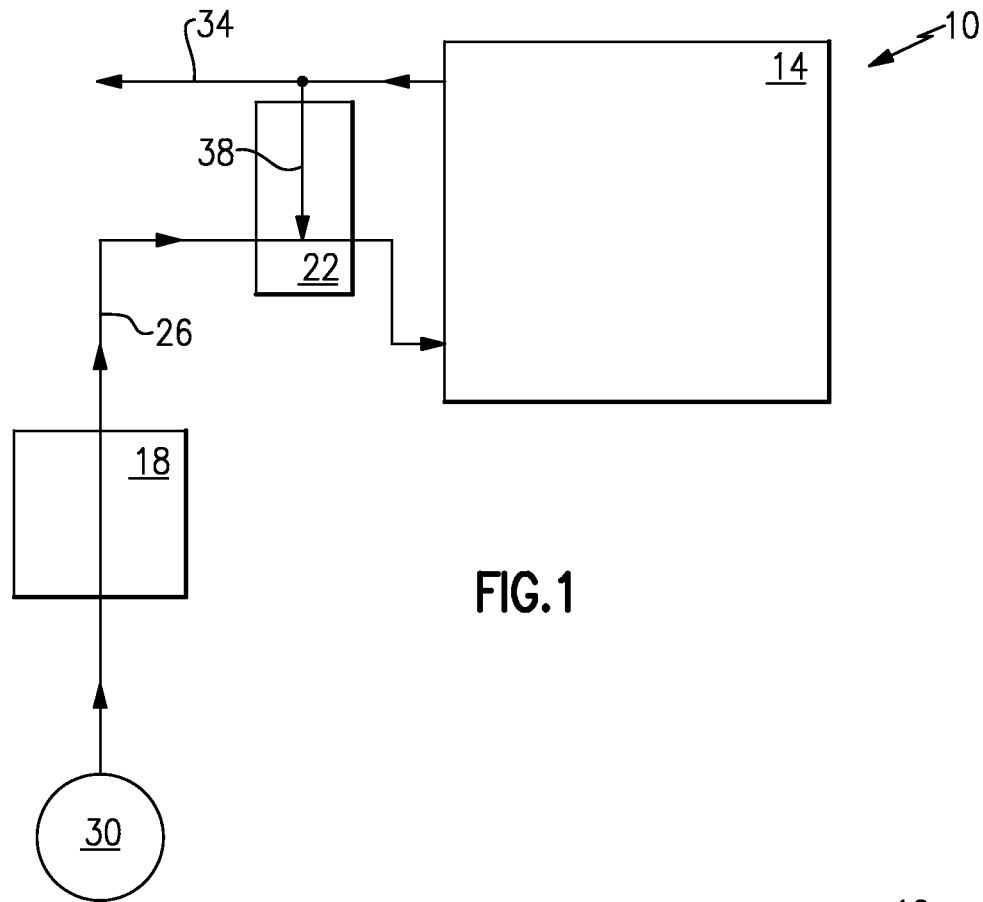
FIG. 1 shows a highly schematic view of an example fuel cell arrangement.

An example fuel cell arrangement 10 includes a fuel cell stack assembly 14, a heat exchanger 18, and an ejector 22. A supply fluid communicates along a fluid communication path 26 from a fluid supply 30, through the heat exchanger 18, to the fuel cell stack assembly 14. An exhaust fluid communicates an exhaust fluid away from the fuel cell stack assembly 14 to the ejector 22 along a fluid communication path 34.

The supply fluid is air in this example. The supply fluid absorbs thermal energy within the fuel cell stack 14. In this example, the supply fluid exits the fuel cell stack 14 along the path 34 as the exhaust fluid. The exhaust fluid is supply fluid that has been heated by the fuel cell stack 14. Carrying thermal energy away from the fuel cell stack 14 in the exhaust fluid cools the fuel cell stack 14.

The heat exchanger 18 helps regulate the temperature of the supply fluid entering the fuel cell stack 14. In this example, the heat exchanger 18 heats the supply fluid. The supply fluid is then communicated to the ejector 22.

At the ejector 22, some of the exhaust fluid is combined with the supply fluid. A recycling path 38 represents the introduction of some of the exhaust fluid to the supply fluid. Introducing some exhaust fluid to the supply fluid increases the amount of thermal energy in the supply fluid. Accordingly, the heat exchanger 18 is not exclusively relied on to preheat the supply fluid. For example, if 20% of the supply fluid is provided by redirecting the exhaust fluid through the ejector, then the heat exchanger must only heat up 80% of the supply fluid. Further, if a desired temperature of the supply fluid entering the fuel cell stack 14 is 700 degrees Celsius, and desired exhaust fluid exiting the fuel cell stack 14 is 825 degrees Celsius, then the heat exchanger need only heat its supply fluid to 669 degrees Celsius, which when mixed with the redirected exhaust will be the desired inlet temperature of 700 degrees (this example makes the simplifying assumption that the two streams are relatively similar in heat capacity).

Figure 2:
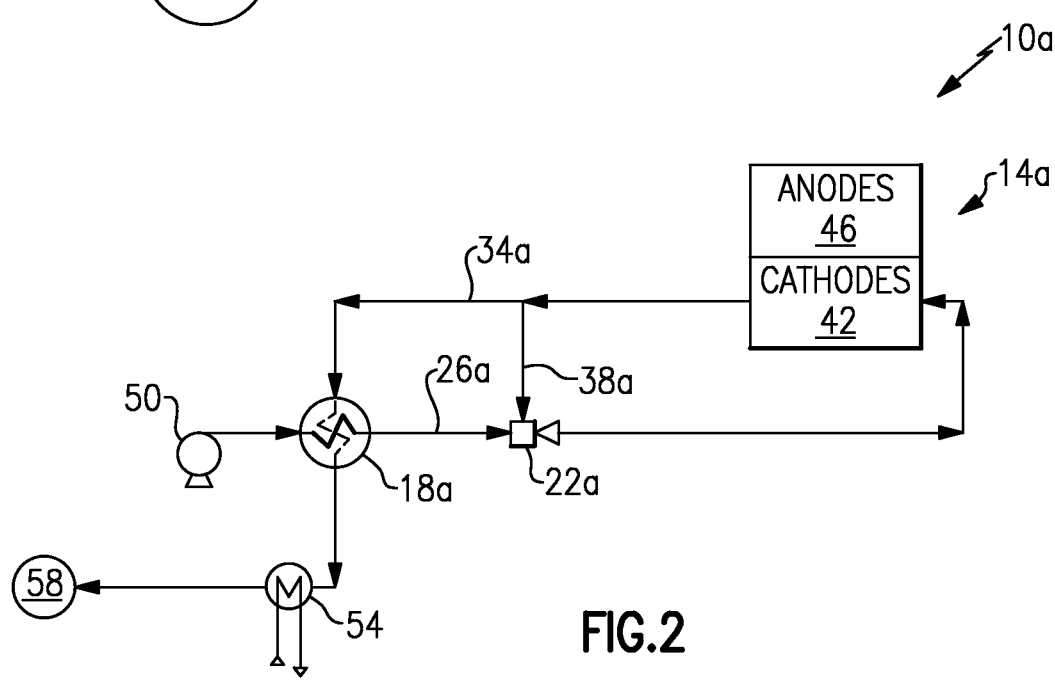
FIG. 2 shows a detailed schematic view of another example fuel cell arrangement.

Referring to FIG. 2, a fuel cell arrangement 10a includes a fuel cell stack 14a having a plurality of cathodes 42 and a plurality of anodes 46. A cathode blower 50, such as a fan, moves fluid along a path 26a to the cathodes 42. The path 26a communicates the fluid through a heat exchanger 18a.

Additional fluid is introduced to the path 26a at an ejector 22. The fluid moving along the path 26a entrains the additional fluid from fluid moving along an exhaust path 34. The entrained fluid moves along a recycling path 38a to the supply path 26a.

In one example, 20% of the flow in the exhaust path 34a at the fuel cell stack 14a is introduced to the supply path 26a at the ejector 22a. In such the example, 20% of the fluid flowing from the ejector 22a to the cathodes 42 is recycled fluid that has already passed through the cathodes 42. The remaining fluid in the exhaust path 34a communicates from near the ejector 22a through the heat exchanger 18a.

Thermal energy is transferred from the fluid in the exhaust path 34a to the fluid in the supply path 26a within the heat exchanger 18a. In this example, the heat exchanger 18a includes a substantial amount of nickel. Notably, the size of the heat exchanger 18a is smaller that in the prior art because the heating requirement is not as great as in the prior art.

This arrangement makes the heat exchanger smaller in three ways. First, less fluid needing thermal energy transfer flows through the heat exchanger because some is provided through the ejector. Second, the fluid in the heat exchanger need only be raised to a lesser temperature, in that it will be mixed with a hotter fluid to obtain the desired temperature. Third, the difference in temperature between the two fluids within the heat exchanger is greater (the colder fluid having been heated to a lesser value), which enables the heat exchanger to transfer heat more proficiently.

After moving through the heat exchanger 18a, additional thermal energy in the fluid moving along the exhaust path 34a may be used as customer heat at 54, or expelled into the surrounding environment at 58.

In this example, the ejector 22a is downstream from the heat exchanger 18a relative to flow along the supply path 26a. Other examples may include other arrangements of the ejector 22a relative to the heat exchanger 18a.

The example ejector 22a utilizes the flow of fluid along the supply path 26a to withdraw fluid from the exhaust path 34a. The blower 50 provides the head for the ejector 22a to withdraw the fluid from exhaust path 34a. The ejector 22a is subsonic in this example, which facilitates lowering the head requirement on the blower 50.

Although described as an ejector, a person having skill in this art and the benefit of this disclosure would understand that other devices may be suitable for removing fluid from the exhaust path 34a for introduction to the supply path 26a.

Figure 3:
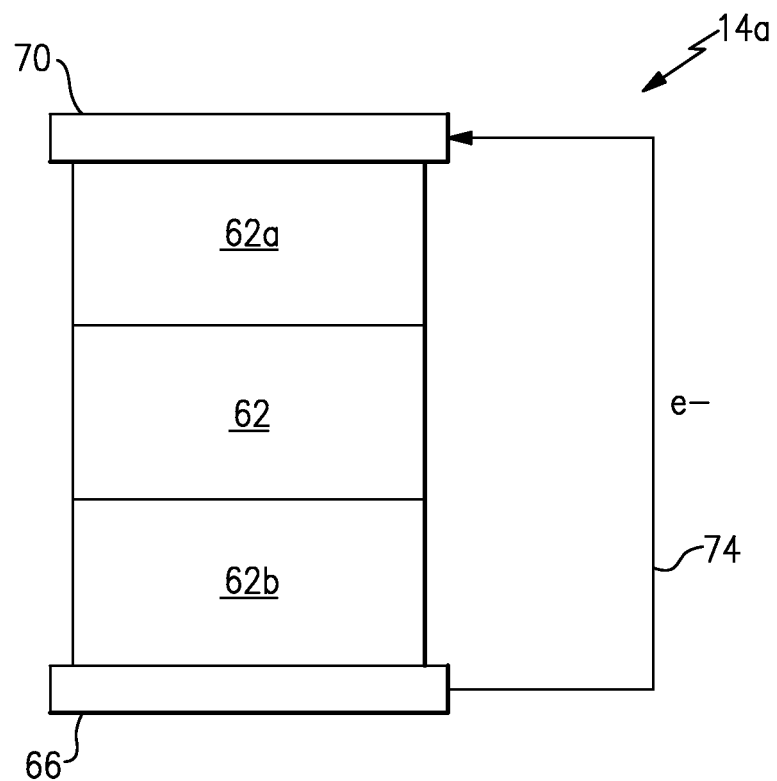
FIG. 3 shows more detailed view of the FIG. 2 fuel cell stack.
Figure 4:
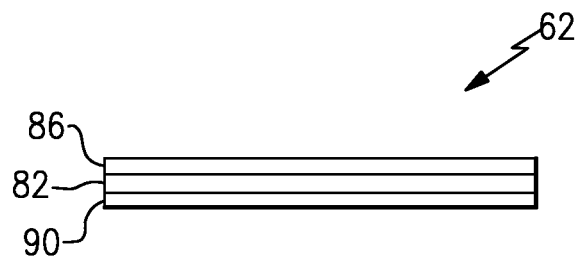
FIG. 4 shows an example fuel cell repeater unit used in the FIG. 3 fuel cell arrangement.

Referring to FIGS. 3 and 4 with continued reference to FIG. 2, the example fuel cell stack assembly 14a includes a solid oxide fuel cell (SOFC) 62 positioned between a SOFC 62a and a SOFC 62b. A first metal plate 66 and a second metal plate 70 are secured at opposing ends of the fuel cell stack assembly 14a. Electrons travel from the SOFC 62a, to the SOFC 62, to the SOFC 62b, and to the second metal plate 66, which provides electric power from the SOFC 62 along path 74 in a known manner. The SOFC 62 is also referred to as the fuel cell stack repeater unit in some examples.

The example SOFC 62 includes a tri-layer cell 78. This example includes an electrolyte layer 82 positioned between a cathode electrode layer 86 and an anode electrode layer 90. The fluid cools the fuel cell stack 14a by carrying thermal energy from the cathodes 42 of the SOFC 62, the SOFC 62a, and the SOFC 62b.

Features of the disclosed examples include increasing thermal energy in a supply fluid by introducing a heated fluid exhausted from a fuel cell stack. Introducing the heated fluid lowers the heating requirements at the heat exchanger and reduces the airflow required to provide the supply fluid.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A fuel cell arrangement comprising:
a fuel cell stack configured to receive a supply fluid and to provide an exhaust fluid that has more thermal energy than the supply fluid;
an ejector configured to separate the exhaust fluid into a first exhaust fluid stream and a second exhaust fluid stream, and to direct the first exhaust fluid stream into the supply fluid, a mixture of the supply fluid and the first exhaust fluid stream being directly supplied from the ejector to the fuel cell stack;
a heat exchanger configured to increases thermal energy in the supply fluid using the second stream of the exhaust fluid; and
wherein the supply fluid and the exhaust fluid are air.

2. The fuel cell arrangement of claim 1, wherein the fuel cell stack comprises a plurality of solid oxide fuel cells.

3. The fuel cell arrangement of claim 1, wherein the mixture of the supply fluid and the first exhaust fluid stream is communicated to a plurality of cathodes in the fuel cell stack.

4. The fuel cell arrangement of claim 1, wherein the mixture of the supply fluid and the first exhaust fluid stream is at least 700 degrees Celsius just before entering the fuel cell stack.

5. The fuel cell arrangement of claim 1, wherein the heat exchanger comprises nickel.

6. The fuel cell arrangement of claim 1, wherein the first exhaust fluid stream is directed into the supply fluid at a location that is downstream from the heat exchanger.

7. The fuel cell arrangement of claim 1, wherein the second exhaust fluid stream is communicated through the heat exchanger to heat the supply fluid.

8. A thermal energy recycling method comprising:
moving a supply fluid at a first temperature into a fuel cell stack;
moving an exhaust fluid at a second temperature away from the fuel cell stack, the second temperature greater than the first temperature;
transferring thermal energy from some of the exhaust fluid to the supply fluid within a heat exchanger;
adding some of the exhaust fluid to the supply fluid after moving the supply fluid through the heat exchanger, the adding including entraining some of the exhaust fluid into the supply fluid using an ejector;
directly supplying a mixture of the exhaust fluid and the supply fluid from the ejector to the fuel cell stack; and
wherein the supply fluid and the exhaust fluid are air.

9. The fuel cell arrangement of claim 1 wherein the ejector directly receives the first exhaust fluid stream from the fuel cell stack.

10. The thermal energy recycling method of claim 8 wherein including entraining some of the exhaust fluid into the supply fluid using the ejector includes directly supplying some of the exhaust fluid from the fuel cell stack to the ejector.

* * * * *